United States Patent
Brown et al.

(10) Patent No.: US 6,510,064 B1
(45) Date of Patent: Jan. 21, 2003

(54) POWER SUPPLY RESTART CIRCUIT

(75) Inventors: Alan E. Brown, Georgetown, TX (US); Matthew B. Mendelow, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 09/275,142

(22) Filed: Mar. 24, 1999

(51) Int. Cl.[7] .......................... H02M 7/10; H02H 7/122
(52) U.S. Cl. .................. 363/49; 363/56.09; 363/56.11; 323/902
(58) Field of Search .................. 363/49, 50, 56.01, 363/56.09, 56.1, 56.11; 323/901, 902

(56) References Cited

U.S. PATENT DOCUMENTS

| | | | |
|---|---|---|---|
| 3,757,302 A | 9/1973 | Pollitt | 340/147 R |
| 4,234,920 A | 11/1980 | Van Ness et al. | 364/200 |
| 4,644,137 A | 2/1987 | Asahi et al. | 219/497 |
| 4,771,356 A | 9/1988 | Hastings | 361/59 |
| 4,951,171 A | 8/1990 | Tran et al. | 361/90 |
| 4,980,791 A * | 12/1990 | Alberkrack et al. | 340/662 |
| 5,083,254 A * | 1/1992 | Feldtkeller | 363/21.16 |
| 5,119,264 A | 6/1992 | Lindfors | 361/59 |
| 5,142,165 A | 8/1992 | Allard et al. | 307/130 |
| 5,224,010 A | 6/1993 | Tran et al. | 361/90 |
| 5,307,256 A | 4/1994 | Silverstein | 363/21 |
| 5,359,281 A * | 10/1994 | Barrow et al. | 323/284 |
| 5,485,363 A | 1/1996 | Reitwiesner | 363/56 |

* cited by examiner

Primary Examiner—Bao Q. Vu
(74) Attorney, Agent, or Firm—Baker Botts L.L.P.

(57) ABSTRACT

A restart circuit for a power supply of an electronic system such as a computer system for delaying the restart of the power supply until a power supply output is in compliance with a specified parameter. In one embodiment, the specified parameter is a particular threshold voltage level and the power supply output is in compliance when it is less than the particular threshold voltage level. In another embodiment of a restart circuit, the specified parameter is a rate of decay in a voltage level and the power supply output is in compliance when it is decaying at a rate less than the predetermined rate. In one embodiment, delaying the restart of the power supply permits components of the system to be reset when the voltage level of the power supply output is in a known state.

38 Claims, 4 Drawing Sheets

POWER SUPPLY RESTART CIRCUIT

BACKGROUND OF THE INVENTION

1. Field of the Invention

This invention relates in general to electronic systems and in particular to power supplies for electronic systems.

2. Description of the Related Art

Computer systems are information handling electronic systems which can be designed to give independent computing power to one user or a plurality of users. Computer systems may be found in many forms including, for example, mainframes, minicomputers, workstations, servers, personal computers, internet terminals, notebooks, and embedded systems. Personal computer (PC) systems, such as the International Business Machines (IBM)(™) compatible PC systems, include desk top, floor standing, or portable versions. A typical PC system includes a processor, associated memory and control logic, and a number of peripheral devices that provide input and output for the system. Such peripheral devices often include display monitors, keyboards, mouse-type input devices, floppy and hard disk drives, CD-ROM drives, network capability cards, terminal devices, modems, televisions, sound devices, voice recognition devices, electronic pen devices, and mass storage devices such as tape drives, CD-R drives or DVDs. Other types of computer systems may include some of these peripheral devices.

Computer systems and other electronic systems typically include power supplies for supplying operating power to the components of the system. A power supply for an electronic system may implement one of a number of power supply converter topologies. Examples of converter topologies include linear and switching converter topologies such as buck, boost, push-pull, fly-back, and forward converter topologies.

Placing a power supply in a nonoperating mode and then quickly placing it in an operating mode such as during a reboot operation may cause problems in a computer system in that the voltage level of the power supply output may not decay to an operably zero voltage level prior to the restart of the computer system. Because reboot and other startup routines typically assume that the power supply output voltage is initially zero when the computer system is started up, rebooting when the power supply output is at a "nonzero" value may cause problems in the rebooting process such as causing the processor to lock or freeze or cause the corruption of data.

Some prior art power supplies have included a timer circuit to provide a timed delay for restarting a power supply. However, adding a timer increases the complexity of a restart circuit. Furthermore, because the delay is predetermined, the delay in restarting may last longer than necessary or not long enough.

SUMMARY OF THE INVENTION

It has been discovered that providing an electronic system with a restart circuit that delays the restart of a power supply until an output of the power supply is in compliance with a specified parameter advantageously restarts a power supply when the power supply output is at a level, such as a specific voltage level, to sufficiently ensure that components of the electronic system powered by the power supply are properly reset.

In one aspect of the invention, a restart circuit includes a comparison circuit for determining whether an output of a power supply is in compliance with a specified parameter. The restart circuit also includes an input to receive a request to place the power supply in an operating mode and an output to provide a signal to place the power supply in an operating mode in response to the request if the comparison circuit determines that the output of the power supply is in compliance with the specified parameter.

In another aspect of the invention, a computer system includes a power supply. The power supply has an output for supplying power to components of the computer system. The computer system also includes a restart circuit that places the power supply in an operating mode in response to receiving via an input a request to place the power supply in an operating mode and in response to a determination that the output of the power supply is in compliance with a specified parameter.

In another aspect of the invention, a method for placing a power supply in an operating mode includes receiving a request to place a power supply in an operating mode from a nonoperating mode and determining whether an output of the power supply is in compliance with a specified parameter. The method also includes placing the power supply in an operating mode in response to receiving the request and in response to a determination that the output of power supply is in compliance with the specified parameter.

In another aspect of the invention, a computer system includes a power supply for supplying power to components of the computer system and means for delaying the restart of the power supply until an output of the power supply is determined to be in compliance with a specified parameter.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise indicated.

DETAILED DESCRIPTION

The following sets forth a detailed description of at least one mode for carrying out the invention. The description is intended to be illustrative of the invention and should not be taken to be limiting.

Figure 1:
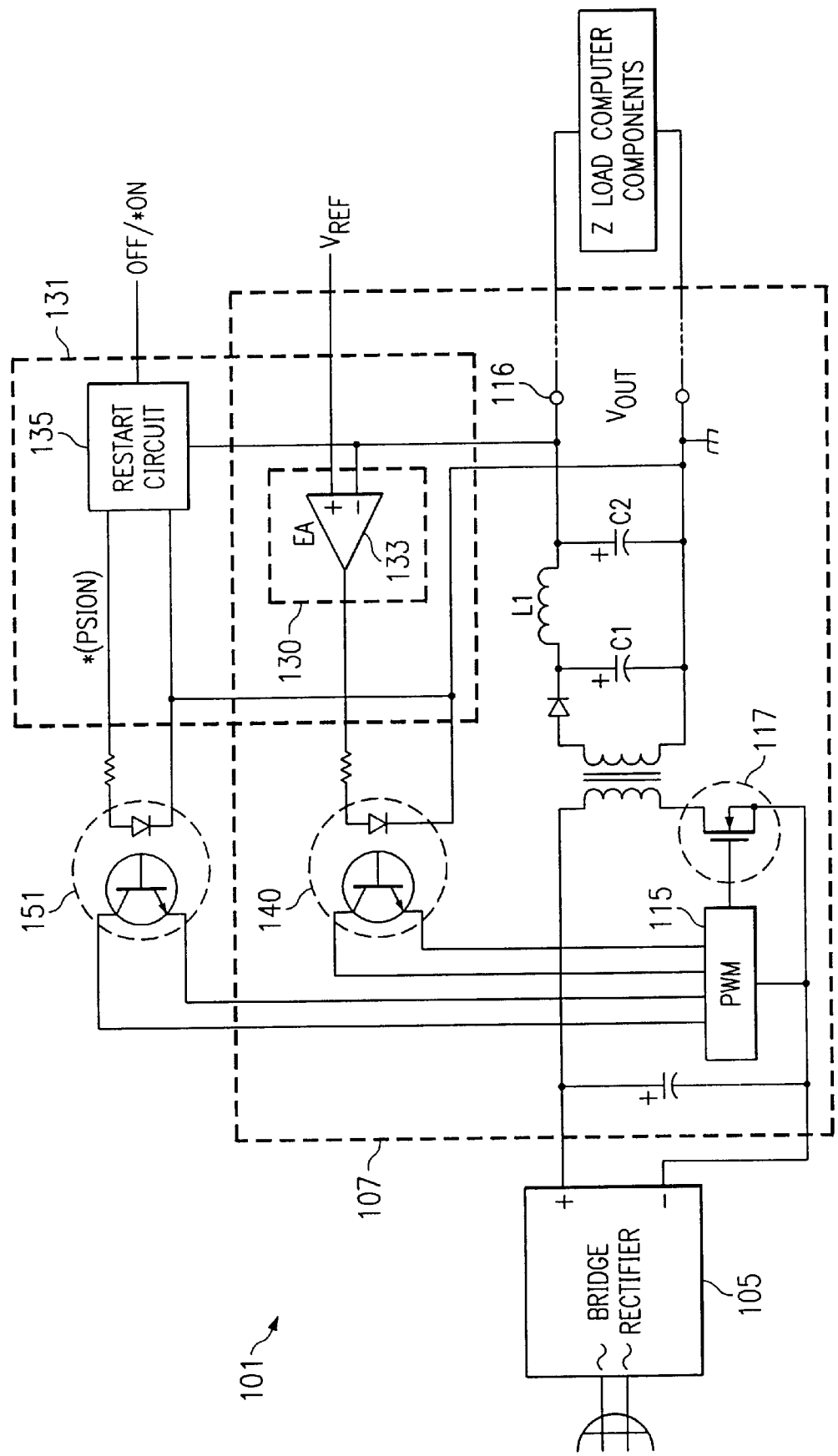
FIG. 1 is a circuit diagram of one embodiment of a power supply and restart circuit according to the present invention.

FIG. 1 shows a circuit diagram of one embodiment of a power supply and restart circuit for an electronic system such as a computer system. Restart circuit 135 delays the restart of power supply 101 until an output 116 of power supply 101 is in compliance with a specified parameter. In one embodiment, the specified parameter is a particular threshold voltage level, and output 116 of power supply 101 is in compliance with the specified parameter when output 116 is less than the threshold voltage level. In another embodiment, the specified parameter is a threshold rate of decrease in a voltage level, and output 116 of power supply 101 is in compliance with the specified parameter when output 116 is decreasing in voltage at a rate less than the threshold rate. Those of skill in the art will recognize that based upon the teachings herein, other parameters which indicate the state of a power supply output may be monitored and utilized in delaying the restart of a power supply until its output is at an appropriate state for the power supply to restart.

Power supply 101 includes a conventional bridge rectifier 105 and a DC-to-DC converter 107 having a fly-back topology. Converter 107 includes a switching circuit 115 for providing a pulse width modulated switching signal to a main switch 117 when power supply 101 is in an operating mode. The duty cycle of the switching signal controls the voltage level ($V_{out}$) at output 116 of power supply 101. When the power supply is in a nonoperating mode, switching circuit 115 does not provide the switching signal thus rendering main switch 117 nonconductive such that no power is supplied at output 116. In the embodiment shown in FIG. 1, main switch 117 is a N-channel metal oxide semiconductor field effect transistor.

In an operating mode, output 116 supplies power at a voltage level (e.g. +5 Volts) to an impedance load (Z load) that includes, for example, computer components (see FIG. 4) or other types of electronic components. Power supply 101 may be configured to provide any number of different voltage levels at output 116, such as +3.3 Volts, +5 Volts, and ±12 Volts. Power supply 101 may also include other converters (not shown). In some electronic systems, rectifier 105 and DC-to-DC converter 107 may be located separately within the electronic system. Those of skill in the art will appreciate that, based upon the teachings herein, other power supply types including power supplies with other converter topologies and power supplies receiving power from other sources such as batteries may be utilized in an electronic system such as computer system 401 that includes a restart delay circuit (See FIG. 4).

Power supply 101 also includes an output stage control circuit 130 that compares output 116 of power supply 101 with a reference voltage ($V_{ref}$) and provides feed back to switching controller 115 for controlling the voltage level of output 116. Output stage control circuit 130 provides a feed back control signal at its output to opti-coupler 140. Opti-coupler 140 provides an isolated feedback control signal to switching circuit controller 115. In FIG. 1, output stage control circuit 130 includes an error amplifier 133 having a noninverting input for receiving a voltage reference signal at voltage level $V_{ref}$ and an inverting input connected to the converter output 116. Converter 107 may include a voltage divider at output 116 where the inverting input of error amplifier 133 receives a signal having a voltage level at a fractional proportion (e.g. ⅓) of $V_{out}$.

Restart circuit 135 has an input for receiving a signal OFF/*ON having an ON state indicating that power supply 101 should be in an operating mode and an OFF state indicating that power supply 101 should be in a nonoperating mode. The output of restart circuit 135 is coupled to a control input of switching circuit 115 via an opticoupler 151 to provide noise isolation. The state of signal *(PS/ON) provided at the output of restart circuit 135 controls whether power supply 101 is in an operating mode or a nonoperating mode.

In one embodiment, the restart circuit 135 is integrated with output stage control circuit 130 as shown by dashed line 131.

Figure 2:
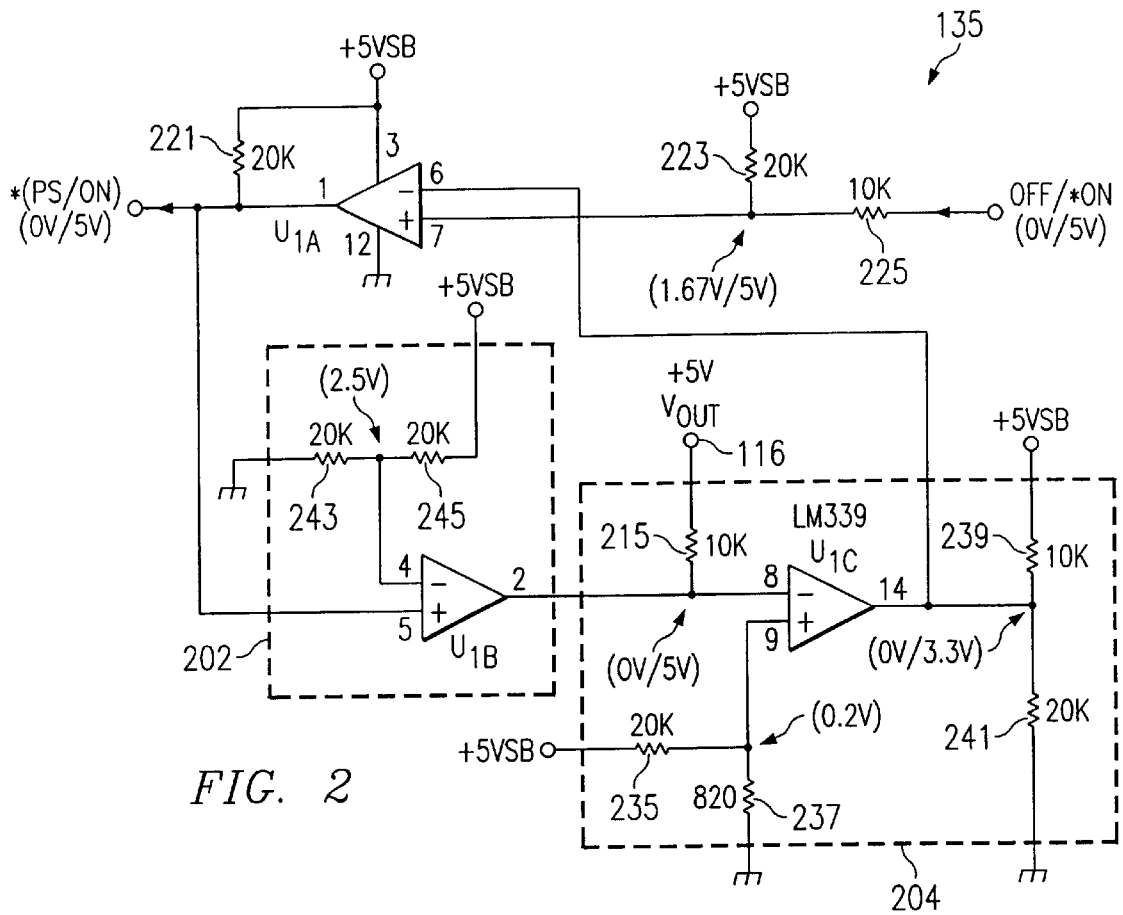
FIG. 2 is a circuit diagram of one embodiment of a restart circuit according to the present invention.

FIG. 2 shows a circuit diagram of one embodiment of a restart circuit. Restart circuit 135 prevents power supply 101 from transitioning from a nonoperating mode to an operating mode if output 116 is not less than a predetermined threshold voltage level. When signal OFF/*ON transitions to a low voltage state (e.g. 0 Volts), restart circuit 135 delays placing power supply 101 in an operating mode until the voltage level of output 116 is less than a +0.2 Volt threshold level established at input pin 9 of comparator $U_{1C}$. By waiting until output 116 is less than +0.2 Volts, the power supplied to the components of an electronic system (such as the memory components, processors, and controllers) is at a known level prior to the restart of the electronic system.

In the embodiment of FIG. 2, the threshold voltage level of +0.2 Volts is selected to ensure that the voltage level of output 116 is at a known state prior to placing power supply 101 in an operating mode. Thus, a computer system (such as computer system 401 of FIG. 4) can be started up with the power supplied to the components of computer system 401 at a known voltage level. The selection of a particular threshold voltage level is dependent upon the tolerances of the electronic components being powered by the power supply. To the components of an electronic system, the threshold voltage level should be an equivalent level to a power supply voltage level at which the components are configured to reset. For example, to the components of computer system 401, a power supply output voltage of 0.2 Volts or less is an essentially "zero" or "no" voltage level for restart purposes. With other electronic systems, other threshold voltage levels may be utilized depending upon the power supply tolerances of the components.

Restart circuit 135 includes comparators $U_{1A}$, $U_{1B}$, and $U_{1C}$ of a three comparator chip LM339 sold by NATIONAL SEMICONDUCTOR INC. of California. The pin numbers shown in FIG. 2 are the pin numbers of the LM339 chip. The positive rail of the comparators is coupled to an output (+5 VSB) of an auxiliary, low capacity, stand-by power converter (not shown) of power supply 101 that is capable of supplying power at +5 Volts even when output 116 is not supplying power. The negative rail of the comparators is coupled to ground. In FIG. 2, the rail hookups are shown for comparator $U_{1A}$ only. Each of the comparators $U_{1A}$, $U_{1B}$, and $U_{1C}$ include an inverting pin (designated by a "−") and a noninverting pin (designated by a "+"). When the inverting pin voltage is higher than the noninverting pin voltage, the output of the respective comparator is forced to the negative rail. Otherwise, the output pin of the respective comparator is placed in an open collector, high impedance state. Shown in parenthesis in FIG. 2 are values indicating the range in voltage levels that may occur at that node during the operation of circuit 135.

Restart circuit 135 includes a comparison circuit 204 that provides a determination of whether the voltage level of output 116 is below a threshold voltage level of +0.2 Volts when power supply 101 is in a nonoperating mode. The noninverting input (pin 9) of comparator $U_{1C}$ receives a +0.2V reference voltage signal generated from the 20 K ohm/820 ohm voltage divider of resistors 235 and 237 coupled to the +5 Volt standby power source. The inverting input (pin 8) of comparator $U_{1C}$ is electrically coupled to output 116 via a 10 K ohm resister 215. The output (pin 14) of comparator $U_{1C}$ is connected to a 10K ohm/20K ohm voltage divider of resistors 239 and 241 coupled to the +5 Volt auxiliary power source. When the voltage level at pin 8 is higher than the voltage level of pin 9, pin 14 is pulled to ground (0 volts), else pin 14 is at a +3.3 volt level generated by the 10K ohm/20K ohm voltage divider. When restart circuit 135 is providing signal *(PS/ON) at a high voltage level placing power supply 101 in a nonoperating mode, pin 14 being at a +3.3 Volt level indicates that output 116 of power supply 101 is less than the +0.2 Volt threshold level.

Restart circuit 135 also includes a comparison control circuit 202 that selectively prevents comparison circuit 204 from determining whether output 116 is less than the +0.2 Volts threshold voltage level when power supply 101 in an operating mode. The noninverting input (pin 5) of comparator $U_{1B}$ is connected to the output of restart circuit 135. The inverting input (pin 4) receives a 2.5 Volt signal generated by the 20K ohm/20K ohm voltage divider of resistors 245 and 243 coupled to the +5 Volt standby power source. When signal *(PS/ON) at the output of restart circuit 135 (pin 1 of comparator $U_{1A}$) transitions from a +5 Volt state to 0 Volt state to place power supply 101 in an operating mode from a nonoperating mode, the +2.5 volt signal at the inverting input (pin 4) of comparator $U_{1B}$ pulls the output (pin 2) of comparator $U_{1B}$ to ground thereby grounding pin 8 of comparator $U_{1C}$. With pin 8 pulled to ground, the +0.2 Volts threshold voltage level at pin 9 drives comparator $U_{1C}$ to an open collector state. With pin 14 of comparator $U_{1C}$ driven to an open collector state, pin 6 of comparator $U_{1A}$ receives the +3.3 Volt signal generated by the 10K ohm/20K voltage divider when power supply 101 is in an operating mode. Thus, when power supply 101 is in an operating mode, power supply output 116 has no effect on comparison circuit 204. As will be described later, preventing output 116 from affecting comparison circuit 204 when power supply 101 is in an operating mode prevents comparison circuit 204 from placing power supply 101 in a nonoperating mode when the voltage level of output 116 rises above the +0.2 Volts threshold level during the startup of power supply 101.

Figure 3:
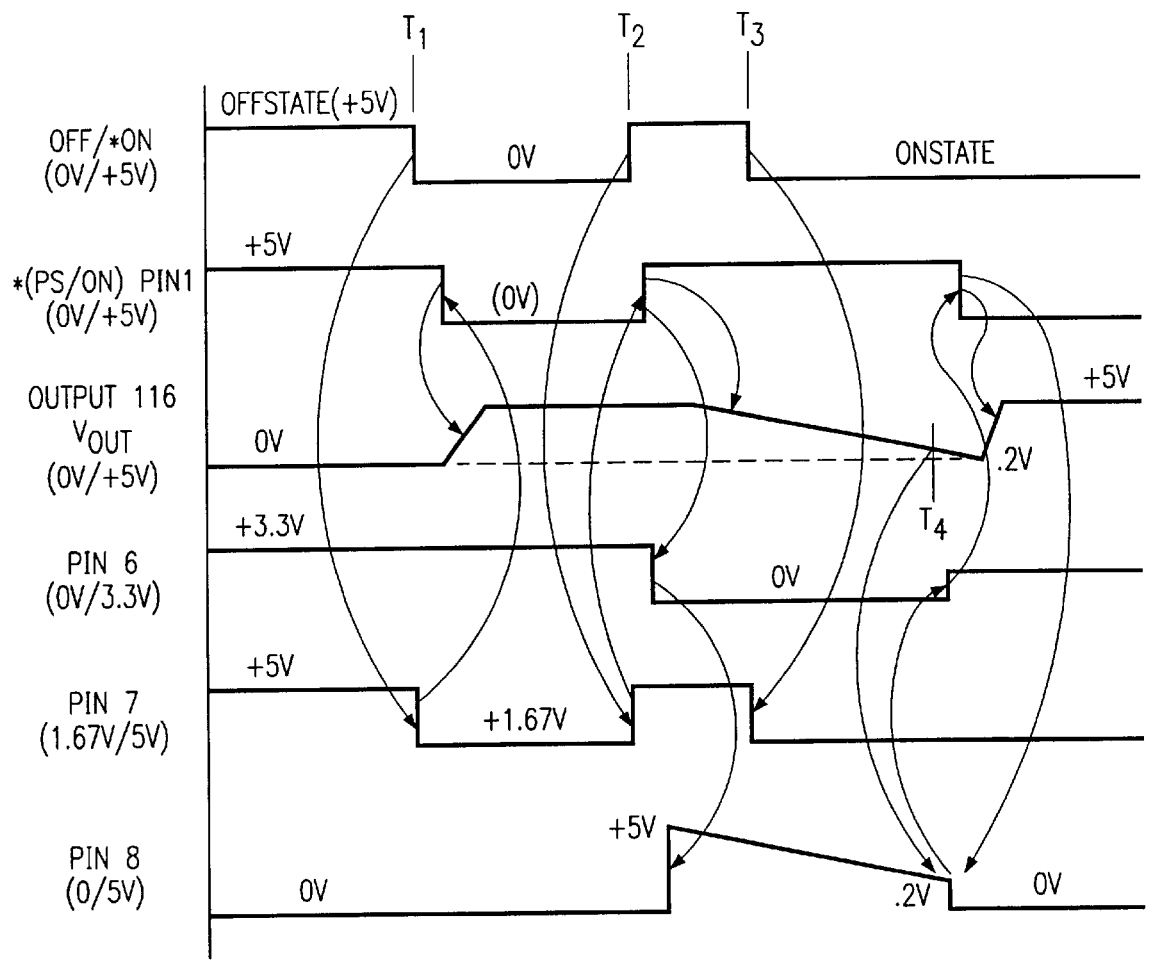
FIG. 3 is a timing diagram showing an operation of the restart circuit of FIG. 2 according to the present invention.

FIG. 3 shows a timing diagram of the operation of restart circuit 135 of FIG. 2. Initially in FIG. 3, signal OFF/*ON is in a high voltage state (+5 Volts) indicating that power supply 101 should be in a nonoperating mode where output 116 is not supplying power. Because the voltage level at pin 6 can not exceed the +3.3 Volt level generated by the 10K ohm/20K ohm voltage divider connected to pin 6, the +5 Volt level of signal OFF/*ON applied to the noninverting input (pin 7) of comparator $U_{1A}$ drives the output (pin 1) of comparator $U_{1A}$ to an open collector state wherein pin 1 of comparator $U_{1A}$ is pull to a +5 Volt level through pull up resistor 221 to provide signal *(PS/ON) at a +5 Volt level. When signal *(PS/ON) is at the +5 Volt level, power supply 101 is in a nonoperating mode wherein switching circuit 115 is not providing a switching signal to main switch 117, and accordingly, output 116 is at 0 Volts.

At time $T_1$, signal OFF/*ON transitions to a low voltage state of 0 Volts indicating a request to place power supply 101 in an operating mode. Signal OFF/*ON transitioning to 0 volts pulls the voltage level of inverting input pin 7 of comparator $U_{1A}$ to 1.67 Volts via a 20k ohm/10k ohm voltage divider of resistors 223 and 225, respectively. Because power supply 101 has been in a nonoperating mode for an extended length of time, the voltage level of output 116 is below the +0.2 Volts threshold level, and accordingly, the input signal at inverting input pin 6 is remains at +3.3 Volts as an indication thereof. The voltage level of pin 7 falling below the +3.3 volt level of pin 6 pulls output pin 1 of comparator $U_{1A}$ to ground, thus driving the *(PS/ON) signal to a low state to place power supply 101 in an operating mode. In response to power supply 101 being placed in an operating mode, switching circuit 115 begins providing the switching signal to main switch 117 which causes the voltage level at output 116 to rise to +5 Volts.

Pulling pin 1 of comparator $U_{1A}$ to ground also pulls to ground the noninverting input (pin 5) of comparator $U_{1B}$ where the +2.5 Volt signal provided by the 20k ohm/20k ohm voltage divider of resistors 245 and 243 connected to pin 4 drives output pin 2 of comparator $U_{1B}$ to ground as well. Driving pin 2 to ground correspondingly drives input pin 8 of comparator $U_{1C}$ to ground, wherein comparator circuit 204 continues to hold inverting input pin 6 of comparator $U_{1A}$ at +3.3 Volts. Thus, even as the voltage level of output 116 rises above the +0.2 Volts threshold level, pin 6 remains at the +3.3 Volt level.

Signal OFF/*ON at time $T_2$ goes high and then quickly low at time $T_3$, in response to, for example, a user manually turning off and then on a push button (See FIG. 4) or from a power recycle operation. Signal OFF/*ON transistioning to a high state at time $T_2$ causes the noninverting input pin 7 of comparator $U_{1A}$ to rise to a high voltage level, thereby driving output pin 1 to a high impedance state, which allows the +5 Volt standby power voltage rail to pull the *(PS/ON) signal to a high state. Signal *(PS/ON) transitioning to a high state places power supply 101 in a nonoperating mode, wherein switching circuit 115 ceases providing the switching signal to main transistor 117. Because of a cessation in the switching signal, the voltage level of output 116 decays as the energy in capacitors $C_1$ and $C_2$ and inductor $L_1$ (See FIG. 1) dissipate. However, at time $T_3$, the voltage level of output 116 has not decayed significantly enough to allow the computer system to restart. Because $V_{out}$ is at a high or unknown voltage level at time $T_3$, the components of computer system 401 may not properly reset or data could become corrupted if computer system 401 were to be restarted at such time. Thus, at time $T_3$, it is undesirable to allow signal *(PS/ON) to follow signal OFF/*ON to a low state and place power supply 101 into an operating mode until output 116 has decayed sufficiently such that the components of computer system 401 can be reset with $V_{out}$ at a known level. Accordingly, at time $T_3$, signal *(PS/ON) stays at a high voltage level until the voltage level of output 116 has decayed below the threshold level of +0.2 Volts.

Because at time $T_3$, signal *(PS/ON) is at a high state, comparator $U_{1B}$ drives output pin 2 of comparator control circuit 202 at an open collector state. Thus, comparison circuit 204 is responsive to the voltage level of output 116 where output 116 is compared against the +0.2 Volts threshold level to determine when output 116 is less than +0.2 Volts. Between time $T_3$ and time $T_4$, the voltage level of output 116 decays towards the threshold voltage level (+0.2 Volts). At time $T_4$, output 116 comes into compliance with the threshold voltage level as it decays below the threshold voltage level, whereby the voltage level of output pin 14 of comparison circuit 204 rises to +3.3 Volts. Because the +3.3 Volt input signal to the inverting input pin 6 is greater than the +1.67 Volt state of noninverting input pin 7, comparator $U_{1A}$ drives output signal *(PS/ON) to a low state. As discussed above, the low state of signal *(PS/ON) places power supply 101 in an operating mode wherein the voltage level of output 116 rises to the +5 Volt level.

With signal *(PS/ON) transitioning to a low state, the +2.5 Volt signal at input pin 4 of comparator $U_{1B}$ drives output pin 2 of comparator $U_{1B}$ to ground. Thus, comparison control circuit 202 again prevents output 116 from affecting the comparison circuit 204 when power supply 101 is in an operating mode. Consequently, as the voltage of output 116 rises above the +0.2 Volts threshold level, output (pin 14) of comparator $U_{1C}$ remains at the +3.3 Voltage level, thereby preventing comparison circuit 204 from pulling signal *(PS/ON) to ground when output 116 rises above the +0.2 Volts threshold level.

Referring back to FIG. 2, restart circuit 135 is advantageously implemented with three comparators of the same semiconductor comparator chip package thereby reducing the complexity of the circuit. However, those of skill in the art will recognize that, based upon the teachings herein, restart circuit 135 can be implemented with other types of electronic devices other than that shown in FIG. 2. For example, restart circuit 135 can be implemented with MOSFETs integrated on a single chip. Also, restart circuit 135 can be implemented with other electronic devices such as logic gates (e.g. AND, NOR, and OR gates) and differential amplifiers.

Also, those of skill in the art will recognize that based upon the teachings herein, restart circuit 135 may be modified to account for variations in the voltage levels and signal states of the input and output signals of restart circuit 135. For example, pin 8 of comparison circuit 204 may be coupled to output 116 via a voltage divider. For such a circuit, the threshold voltage level signal received by pin 9 would be reduced proportionately by the ratio of such a voltage divider. Such modifications of restart circuit 135 may easily be accomplished by one of ordinary skill in the art after reading this disclosure to accommodate for such differences.

With other restart circuits, the comparison control circuit 202 may be located (with some modification) at other places in the restart circuit such as between comparators $U_{1C}$ and $U_{1A}$.

An advantage of the restart circuit of FIG. 2 is that it can be implemented without utilizing capacitors thereby lessening the complexity of the circuit and making the circuit easier to integrate in a semiconductor chip.

Figure 4:
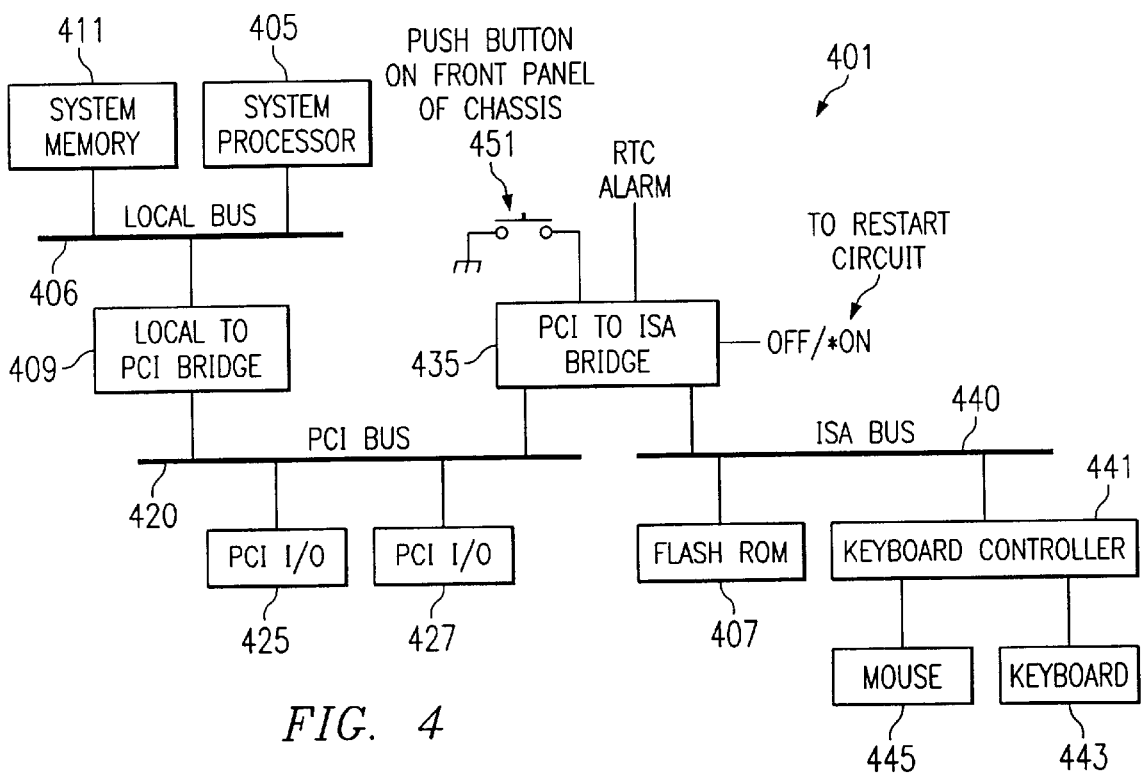
FIG. 4 is a block diagram of one embodiment of an electronic system.

FIG. 4 shows a block diagram of computer system 401 that implements restart circuit 135. Computer system 401 includes a number of conventional computer system components such as a system processor 405, a system memory 411, a flash ROM 407, and a keyboard controller 441 that is operably coupled to a mouse 445 and a keyboard 443. The components are operably coupled together via computer system busses 406, 420, and 440 and bus bridge circuits 409 and 435. One example of a computer system is the OPTIPLEX GX1 sold by the DELL COMPUTER CORP(™). However, those of skill in the art will appreciate that, based upon the teachings herein, a restart circuit (such as restart circuit 135) may be implemented with other types of computer systems or electronic systems.

The PCI to ISA bridge circuit 435 includes circuitry for providing signal OFF/*ON to restart circuit 135. The state of signal OFF/*ON can be dependent upon a number of inputs into bridge circuit 435 including a push button signal from push button 451 which can be mounted on a front chassis panel (not shown) of computer system 401. A user toggles push button 451 to manually place the power supply in an operating mode and a nonoperating mode. Bridge circuit 435 also receives a real time clock (RTC) signal that turns on or off computer system 401 at predetermined times during the day. Signal OFF/*ON is also responsive to computer operations such as power cycle and reboot operations which are designed to turn off and quickly turn on computer system 401. Signal OFF/*ON can also be responsive to numerous other power management or computer operation commands, signals, or conditions that provide indications to place power supply 101 in operating or nonoperating modes.

Utilizing PCI to ISA bus bridge circuit 435 to provide signal OFF/*ON reduces the number of components in computer system 401 in that this feature is integrated with the bus circuitry of bridge 435. A PIIX4 chip sold by INTEL(™) is one example of a bridge circuit that may be utilized. However other circuits may be utilized to provide signal OFF/*ON including single purpose circuits or other multi-functional integrated chips.

Figure 5:
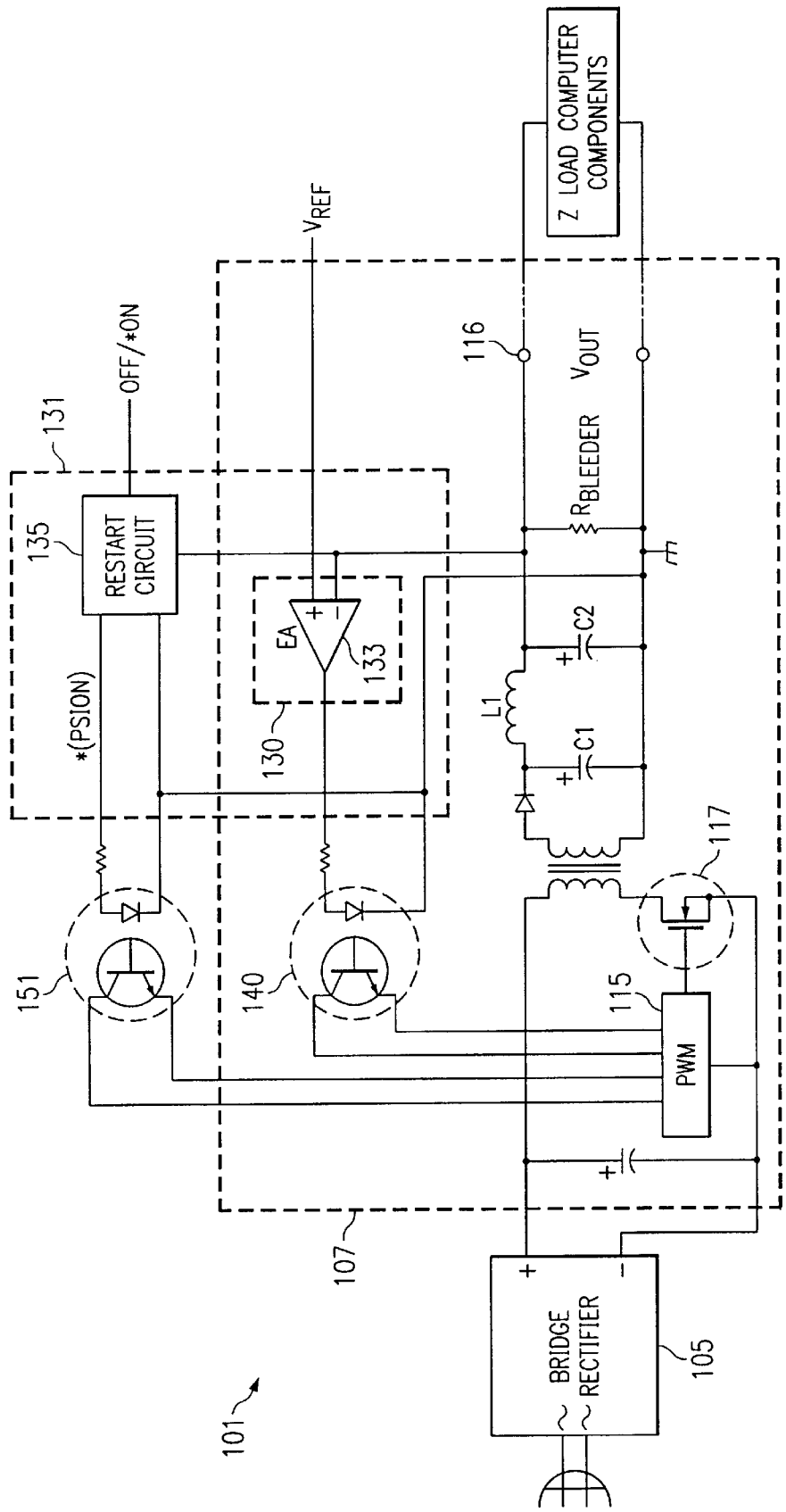
FIG. 5 illustrates a circuit diagram of an example embodiment of a power supply and restart circuit according to the present invention.

In an alternative embodiment, restart circuit 135 does not place power supply 101 in an operating mode until the voltage level of power supply output 116 is decreasing at a rate less than a threshold rate. Referring back to FIG. 2, an exemplary restart circuit of this alternative embodiment would include a differentiator circuit (not shown) located (in the location of resistor 215) between output 116 and the inverting input (pin 8) of comparator $U_{1C}$. The voltage level of the output of the differentiator circuit would be inversely proportional to the rate of change of the voltage level of output 116, thereby providing a voltage level indicative of the rate of change of the voltage level of output 116. When the rate of decay of the voltage level falls below a threshold rate, the voltage level of input pin 8 will fall below the fixed voltage level of input pin 9, wherein the voltage level of output pin 14 would transition to the +3.3 Volt value. For some circuits, the threshold rate is the "three times rate" (the rate of decay of 3 time constants) of the RC circuit formed from the parallel capacitance and resistance (such as from a bleeder resistor) of the power supply output 116 to ground as shown in FIG. 5. In one embodiment, the threshold rate is less than –0.4 millivolts/milliseconds.

With some computer systems or other electronic systems, leakage current from a standby power converter (not shown) may affect the voltage level of output 116 such that the voltage level does not fall below a particular voltage (e.g. +0.2 Volts). An advantage of the alternative embodiment is that it can place a power supply in an operating mode despite the output never falling below a particular voltage level.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

What is claimed is:

1. A restart circuit comprising:
    a comparison circuit for determining whether an output of a power supply is in compliance with a specified parameter such that a component being supplied power by the power supply is reset when the power supply is in compliance with the specified parameter;
    an input to receive a request to place the power supply in an operating mode; and
    an output to provide a signal to place the power supply in an operating mode in response to the request if the comparison circuit determines that the output of the power supply is in compliance with the specified parameter.

2. The circuit of claim 1 wherein the specified parameter includes a threshold voltage level, and the output of the power supply is in compliance with the specified parameter when the output of the power supply is less than the threshold voltage level.

3. The circuit of claim 2 wherein the threshold voltage level is approximately 0.2 volts.

4. The circuit of claim 2 wherein the comparison circuit includes a comparator having a first input for receiving a first signal having a voltage level proportional to the voltage level of the output of the power supply, the comparator having a second input for receiving a second signal representing the threshold voltage level, the comparator having an output for providing the determination of whether the output of the power supply is less than the threshold voltage level.

5. The circuit of claim 4 further comprising:
a comparison control circuit having an input to receive a signal corresponding to the output of the restart circuit, the comparison control circuit selectively preventing the first input of the comparator from receiving the first signal when the output of the restart circuit is providing a signal to place the power supply in an operating mode.

6. The circuit of claim 1 further comprising:
a comparison control circuit including circuitry to selectively prevent the comparison circuit from providing a determination that the output of the power supply is not in compliance with the specified parameter when the output of the restart circuit is providing a signal to place the power supply in an operating mode.

7. The circuit of claim 1 wherein the specified parameter includes a threshold rate of decrease in a voltage level, and the output of the power supply is in compliance with the specified parameter when the output of the power supply is decreasing in voltage at a rate less than the threshold rate.

8. The circuit of claim 7 wherein the predetermined rate is −0.4 millivolts/milliseconds.

9. The circuit of claim 7 wherein:
the output of the power supply has a parallel resistance and capacitance with respect to a ground potential; and
the predetermined rate is a three times rate of a resistance-capacitance circuit formed from the parallel resistance and capacitance of the output of the power supply with respect to the ground potential.

10. The circuit of claim 1 wherein the power supply includes an output stage control circuit, the output stage control circuit has an output to provide a control signal to adjust the voltage level of the output of the power supply in response to a comparison of a signal representing the output of the power supply with a reference voltage level, and the restart circuit is integrated with the output stage control circuit.

11. The circuit of claim 1 wherein the output of the restart circuit provides a signal to place the power supply in an nonoperating mode in response to receiving via its input a request to place the power supply in a nonoperating mode regardless of a determination of the comparison circuit.

12. A computer system comprising:
a power supply, the power supply having an output for supplying power to components of the computer system; and
a restart circuit, the restart circuit placing the power supply in an operating mode in response to receiving via an input a request to place the power supply in an operating mode and in response to a determination that the output of the power supply is in compliance with a specified parameter such that the components of the computer system are reset when the power supply is in compliance with the specified parameter.

13. The computer system 12 wherein the specified parameter includes a threshold voltage level, and the output of the power supply is in compliance with the specified parameter when the output of the power supply is less than the threshold voltage level.

14. The computer system of claim 13 wherein the threshold voltage level is at a level such that the components of the computer system are reset to a known state when the power supply is placed in an operating mode.

15. The computer system of claim 13 wherein the threshold voltage is approximately 0.2 volts.

16. The computer system of claim 13 wherein the restart circuit includes:
a comparison circuit to provide the determination that the output of the power supply is less than the threshold voltage.

17. The computer system of claim 16 wherein the comparison circuit includes a comparator having a first input for receiving a first signal having a voltage level proportional to the voltage level of the output of the power supply, the comparator having a second input for receiving a second signal representing the threshold voltage level, the comparator having an output for providing the determination of whether the output of the power supply is less than the threshold voltage level.

18. The computer system of claim 17 wherein the restart circuit further includes:
a comparison control circuit, the comparison control circuit having an input to receive a signal corresponding to an output of the restart circuit, the comparison control circuit selectively preventing the first input of the comparator from receiving the first signal when the output of the restart circuit is providing a signal to place the power supply in an operating mode.

19. The computer system of claim 16 wherein the restart circuit further includes a comparison control circuit, wherein the comparison control includes circuitry to selectively prevent the comparison circuit from providing a determination that the output of the power supply is not in compliance with the specified parameter when an output of the restart circuit is providing a signal to place the power supply in an operating mode.

20. The computer system of claim 12 wherein the specified parameter includes a threshold rate of decrease in a voltage level, and the output of the power supply is in compliance with the specified parameter when the output of the power supply is decreasing in voltage at a rate less than the threshold rate.

21. The computer system of claim 20 wherein the predetermined rate is −0.4 millivolts/milliseconds.

22. The computer system of claim 20 wherein:
the output of the power supply has a parallel resistance and capacitance with respect to a ground potential; and
the predetermined rate is a three times rate of a resistance-capacitance circuit formed from the parallel resistance and capacitance of the output of the power supply with respect to the ground potential.

23. The computer system of claim 12 wherein:
the power supply includes an output stage control circuit, the output stage control circuit providing a control signal to adjust the voltage level of the output of the power supply in response to a comparison of a signal representing the output of the power supply with a reference voltage level; and
the restart circuit is integrated with the output stage control circuit.

24. The computer system of claim 12 wherein the power supply is a switching power supply, the power supply includes a switching controller for providing a switching signal, and the switching controller initiates providing the switching signal in response to the restart circuit placing the power supply in the operating mode.

25. The computer system of claim 12 further comprising:
an opti-coupler circuit having an input coupled to an output of the restart circuit and providing an isolated control signal to the power supply that is responsive to the output of the restart circuit, the restart circuit placing the power supply in an operating mode via the opti-coupler.

26. The computer system of claim 12 wherein the request to place the power supply in an operating mode is initially generated from a manually operated push button.

27. The computer system of claim 12 wherein the request to place the power supply in an operating mode is initially generated via a power recycle command.

28. The computer system of claim 12 wherein the restart circuit is configured to receive power from an auxiliary power source.

29. The computer system of claim 12 wherein the power supply further includes:
a converter having a switching topology, the converter including a switching circuit providing a switching signal to a main switch to supply power at the output of the power supply when the power supply is in an operating mode.

30. A method for placing a power supply in an operating mode comprising:
receiving a request to place a power supply in an operating mode from a nonoperating mode;
determining whether an output of the power supply is in compliance with a specified parameter such that a component being supplied power by the power supply is reset when the power supply is in compliance with the specified parameter; and
placing the power supply in an operating mode in response to receiving the request and in response to a determination that the output of power supply is in compliance with the specified parameter.

31. The method of claim 30 wherein the specified parameter includes a threshold voltage level, and the output of the power supply is in compliance with the specified parameter when the output of the power supply is less than the threshold voltage level.

32. The method of claim 31 wherein determining that the output of the power supply is in compliance further includes comparing a voltage level proportional to the output of the power supply with a reference voltage level.

33. The method of claim 30 wherein the specified parameter includes a predetermined rate of decrease in a voltage level, and the output of the power supply is in compliance with the specified parameter when the output of the power supply is decreasing in voltage at a rate less than the predetermined rate.

34. The method of claim 30 further comprising:
preventing the determination of whether the output of the power supply is in compliance when the power supply is in an operating mode.

35. The method of claim 30 further comprising:
placing the power supply in a nonoperating mode in response to receiving a request to turn off the power supply.

36. A computer system comprising:
a power supply for supplying power to components of the computer system; and
means for delaying the restart of the power supply until an output of the power supply is determined to be in compliance with a specified parameter such that the components of the computer system are reset when the power supply is in compliance with the specified parameter.

37. The computer system of claim 36 wherein the specified parameter includes a threshold rate of decrease in a voltage level, and the output of the power supply is in compliance with the specified parameter when the output of the power supply is decreasing in voltage at a rate less than the threshold rate.

38. The computer system 36 wherein the specified parameter includes a threshold voltage level, and the output of the power supply is in compliance with the specified parameter when the output of the power supply is below the threshold voltage level.

* * * * *